United States Patent [19]
Asthana

[11] Patent Number: 5,396,476
[45] Date of Patent: Mar. 7, 1995

[54] SENSING CONTAMINATION LEVEL IN AN OPTICAL STORAGE DEVICE

[75] Inventor: Praveen Asthana, Tucson, Ariz.

[73] Assignee: International Business Machines Corporation, Armonk, N.Y.

[21] Appl. No.: 125,273

[22] Filed: Sep. 23, 1993

[51] Int. Cl.⁶ .............................................. G11B 7/085
[52] U.S. Cl. ................... 369/44.25; 369/44.32; 369/44.35; 369/54; 369/44.28
[58] Field of Search ............... 369/44.36, 44.35, 44.29, 369/44.25, 44.34, 54, 32, 13, 44.27, 44.32, 46.11

[56] References Cited

U.S. PATENT DOCUMENTS

| | | | |
|---|---|---|---|
| 4,356,390 | 10/1982 | Feilchenfeld | 235/455 |
| 4,568,183 | 2/1986 | Douglas | 356/43 |
| 4,942,564 | 7/1990 | Hofer et al. | 369/54 X |
| 5,134,602 | 7/1992 | Baca et al. | 369/44.27 |

Primary Examiner—W. R. Young
Assistant Examiner—Thang Van Tran
Attorney, Agent, or Firm—D. A. Shifrin

[57] ABSTRACT

The present invention provides an apparatus and method for sensing the contamination level in an optical storage device and for issuing a signal when the contamination exceeds a predetermined value relative to a base value. The tracking error signal gain of an optical drive is monitored and compared with a base gain. An alert signal is then generated if the actual measured gain exceeds a predetermined level relative to the base gain, whereupon a cleaning device can be mounted in the storage device and optical elements cleaned.

22 Claims, 3 Drawing Sheets

SENSING CONTAMINATION LEVEL IN AN OPTICAL STORAGE DEVICE

TECHNICAL FIELD OF THE INVENTION

The present invention relates to optical storage devices, and in particular, to a method and apparatus for sensing the contamination level in an optical storage device and for issuing a signal when the contamination exceeds a predetermined value relative to a base value.

BACKGROUND OF THE INVENTION

Data storage recording devices for reading/writing from/to optical media, such as rewritable magneto-optical (MO) disks and write once (WORM) disks, employ a light source to focus a beam of light through optical elements onto a surface of the media. Light reflected by the surface is directed back through additional optical elements and onto a detector which generates electrical signals representative of data recorded on the media surface. Reflected light is also directed through optical elements onto another detector (generally a differential detector) which generates electrical signals used, in conjunction with two servo systems, to ensure that the light beam remains focused on the media surface and to ensure that the beam seeks to and follows the desired data track.

Because it has not yet been possible to completely seal an optical drive or to isolate the optical elements from the external environment, dust, lint, smoke particles and other common air-borne pollutants can infiltrate the drive and light on the optical elements. Any cooling fan in the drive unit accelerates the contamination. As contaminants build up on the optical elements, the intensity of light reaching the disk and reaching the detectors is reduced, thereby reducing readback signal levels, adversely affecting read, write, seek and tracking performance and leading to premature failure of the drive.

Cleaning cartridges, shaped and dimensioned to resemble actual optical disk cartridges, can be used to clean some of the optical elements within a drive. Heretofore, however, cleaning has been performed either at some periodic interval or upon drive failure. Neither routine is entirely satisfactory. Periodic cleaning which is dependent upon a human operator to initiate is inconvenient and may tend to be postponed or forgotten. Periodic cleaning which occurs in an automated storage and retrieval library environment may be initiated at an inopportune time and can otherwise consume valuable library resources. And, waiting until a drive fails before inserting a cleaning cartridge increases the risk of data loss and can lead to undesirable downtime of the storage system.

OBJECTS AND SUMMARY OF THE INVENTION

In view of the foregoing, it is an object of the present invention to sense the contamination level in an optical drive and to generate a signal that can be reported to the host if the contamination build up becomes excessive.

It is another object of the present invention to sense the contamination level by monitoring relative changes in an existing signal.

These and other objects are achieved in this invention by monitoring the tracking error signal gain of an optical drive, comparing the gain with a base gain and generating an alert signal if the actual gain exceeds a predetermined level relative to the base gain.

The foregoing and other features and advantages of the invention will be apparent from the following more particular description of preferred embodiments of the invention, as illustrated in the accompanying drawings.

DETAILED DESCRIPTION OF THE INVENTION

Figure 1:
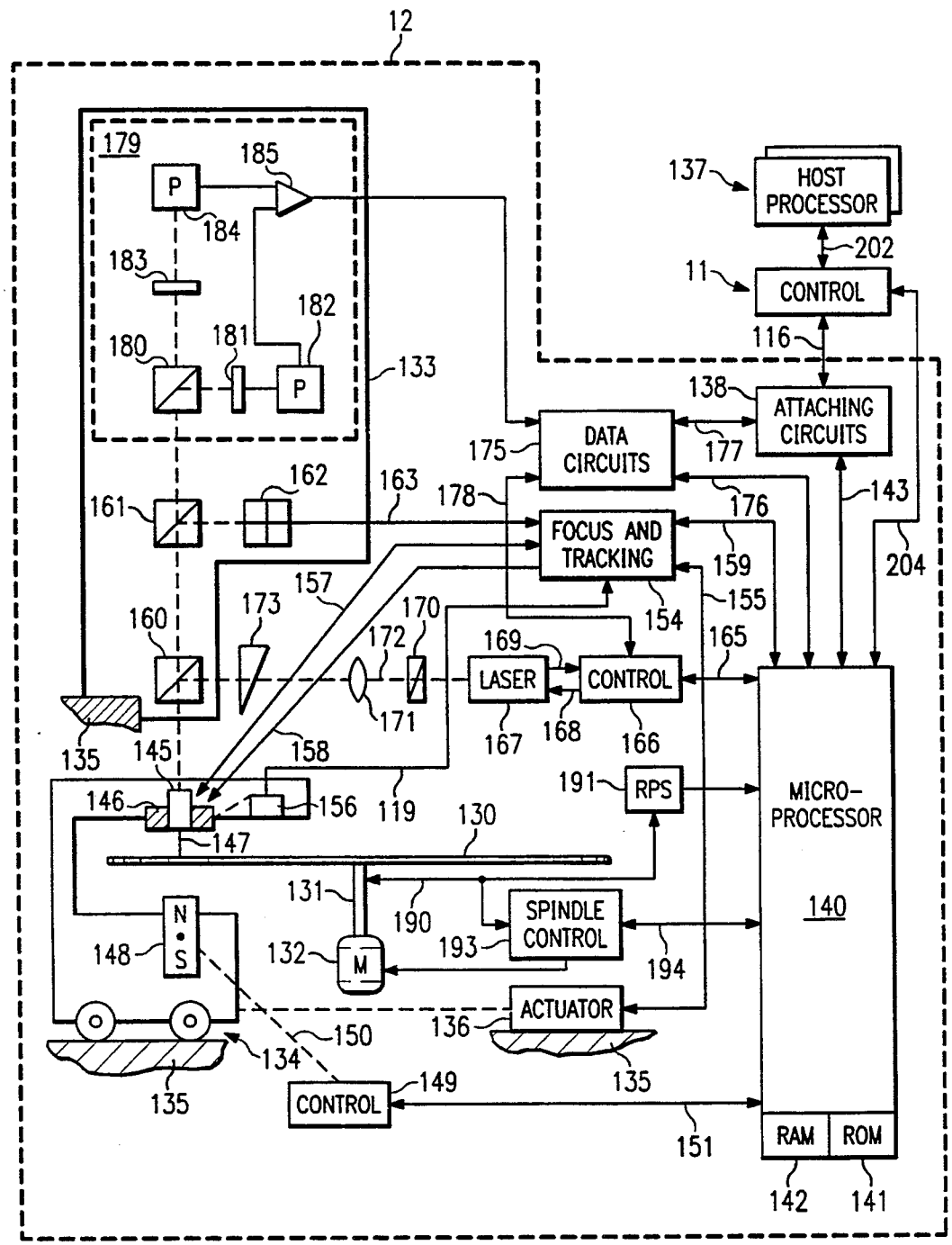
FIG. 1 is a block diagram of an optical disk recorder incorporating the present invention.

An optical recorder 12 with which the present invention may be advantageously employed is shown in FIG. 1. Although the following description refers specifically to a magneto-optical (MO) recording device, the present invention is equally applicable to other optical recording methods, including write once (WORM). An MO disk 130 is removably mounted for rotation on a spindle 131 by a motor 132. An optical head-carrying carriage, generally denoted by numeral 134, is mounted to a frame 135 of the recorder 12 and moves radially across the disk 130. The radial motions of the carriage 134 enable access to any one of a plurality of concentric tracks or circumvolutions of a spiral track for recording and recovering data on and from the disk 130. A linear actuator 136 mounted on the frame 135 radially moves the carriage 134 for enabling track accessing. The recorder 12 is interconnected through a controller 11 to one or more host processors 137 via a cable or bus 116 and 202. Such host processors 137 may be control units, personal computers, large system computers, communication systems, image signal processors, and the like. Attaching circuits 138 provide the logical and electrical connections between the optical recorder 12 and the controller 11.

Figure 2:
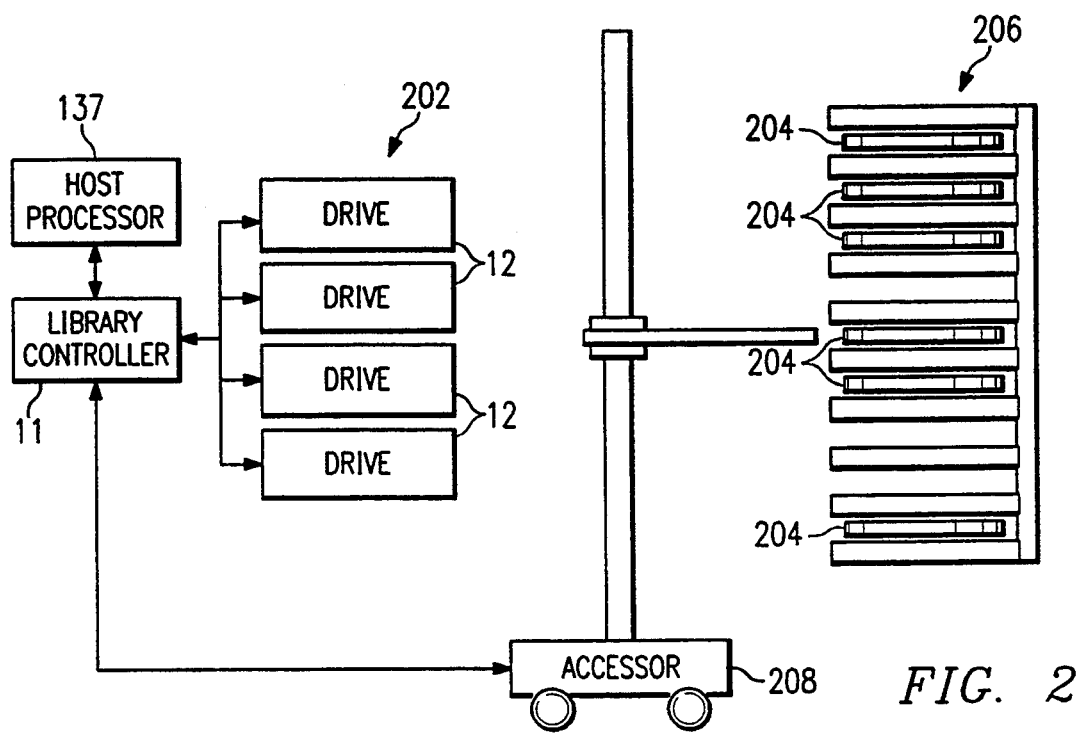
FIG. 2 is a block diagram of the optical disk recorder of FIG. 1 incorporated into an automated storage and retrieval environment.

The optical recorder 12 can be incorporated into an automated storage and retrieval system 200, as illustrated in FIG. 2. The system 200 includes one or more optical recorders 202, including the recorder 12, a number of optical disks 204 in an array of storage cells 206, and an accessor 208. The drives 202 and accessor 208 are interconnected with the controller 11. The controller 11 directs the accessor 208 to transport a desired disk between the array of cells 206 and one of the optical recorders 202.

A microprocessor 140 controls the operation of the recorder 12. Control data, status data, commands and the like are exchanged between the attaching circuits 138 and the microprocessor 140 via a bidirectional bus 143. Included in the microprocessor 140 is a program or microcode-storing read-only memory (ROM) 141 and a data and control signal storing random-access memory (RAM) 142.

The optics of the recorder 12 include an objective or focusing lens 145 mounted for focusing and radial tracking motions on the carriage 134 with a fine actuator 146. The fine actuator 146 includes mechanisms for moving the objective lens 145 toward and away from the disk 130 for focusing and for moving the objective lens 130 with radial movements parallel to the carriage 134 motions. Such movements are performed, for example, when changing tracks within a small range of tracks, typically 100, so that the carriage 134 need not be actuated each time a track adjacent to a track currently being accessed is to be accessed. Numeral 147 denotes a two-way light path between the objective lens 145 and the disk 130.

In MO recording, a magnet 148 (which can be either an electromagnet or a permanent magnet) provides a weak magnetic steering or bias field for directing a remnant magnetization to a direction of a small spot on the disk 130 illuminated by laser light from the objective lens 145. The laser light spot heats the illuminated spot on the record disk 12 to a temperature above the Curie point of the magnetooptic layer (not shown, but which can be an alloy of rare earth and transitional metals as taught by Chaudhari, et al., U.S. Pat. No. 3,949,387). This heating enables the magnet 148 to direct the remnant magnetization to a desired direction of magnetization as the spot cools below the Curie point temperature. The magnet 148 is shown as oriented in the "write" direction, i.e., binary ones recorded on the disk 130 normally are "north pole remnant magnetization". To erase the disk 130, the magnet 148 rotates so the south pole is adjacent the disk 130. A magnet control 149, which is operatively coupled to the rotatable magnet 148 as indicated by a dashed line 150, controls the write and erase directions of the magnet 148. The microprocessor 140 supplies control signals over a line 151 to a control unit 149 for effecting reversal of the magnetic steering field.

It is necessary to control the radial position of the light beam following path 147 such that a track or circumvolution is faithfully followed and that a desired track or circumvolution is quickly and precisely accessed. To this end, focus and tracking circuits 154 control both the coarse actuator 136 and the fine actuator 146. The positioning of the carriage 134 by the fine actuator 136 is precisely controlled by control signals supplied by the focus and tracking circuits 154 and the microprocessor 140 over lines 155 and 159 to the actuator 136. Additionally, the fine actuator 146 control by the focus and tracking circuits 154 is exercised through control signals travelling to the fine actuator 146 over lines 157 and 158, respectively, for effecting respective focus and track following and seeking actions. A sensor 156 senses the position of the fine actuator 146 relative to the carriage 134 to create a relative position error (RPE) signal 119. This signal goes to the focus and tracking circuits 154. The line 157 carries focus error signals from the circuits 154 to the focus mechanisms in the fine actuator 146.

The focus and tracking position sensing are achieved by analyzing laser light reflected from the disk 130 over the path 147, thence through the objective lens 145, through a one-half mirror 160 to be reflected by another half-mirror 161 to a "quad-detector" 162. The quad-detector 162 has four photoelements which respectively supply signals on four lines collectively denominated by numeral 163 to the focus and tracking circuits 154. Aligning one axis of the detector 162 with a track center line, track following operations are enabled. The focus and tracking circuits 154 analyze the signals on the lines 163 to control both focus and tracking and generate a variety of signals, including a tracking error signal (TES), indicative of track crossings, a relative position error signal (RPE) and a focus error signal (FES). Such signals are transmitted to the microprocessor 140 which, in response, issues control signals to various control loops to maintain desired tracking, focusing, laser power and other drive parameters. Additionally, the microprocessor 140 transmits drive calibration signals, including a TES gain value, to the host processor 137 through the attaching circuits 138. The TES gain value is the amount of gain applied to the unadjusted TES to ensure a substantially constant peak-to-peak TES.

Recording or writing data onto disk the 130 is now described. It is assumed that the magnet 148 is rotated to the desired position for recording data. The microprocessor 140 supplies a control signal over the line 165 to a laser control unit 166 for indicating that a recording operation is to ensue. This means that the laser 167 is energized by the control unit 166 to emit a high-intensity laser light beam for recording; in contrast, for reading, the laser 167 emits a light beam at a reduced intensity for to prevent heating the laser illuminated spot on the disk 130 above the Curie point. The control unit 166 supplies its control signal over a line 168 to the laser 167 and receives a feedback signal over a line 169 indicating the emitted light intensity. The control unit 166 adjusts the light intensity to a desired value. The laser 167, a semiconductor laser, such as a gallium-arsenide diode laser, can be modulated by data signals so the emitted light beam represents the data to be recorded by intensity modulation. In this regard, the data circuits 175 supply data indicating signals over the line 178 to the laser control unit 166 for effecting such modulation. The modulated light beam passes through the polarizer 170 (linearly polarizing the beam), thence through a collimating lens 171. The collimated beam 172 is directed through a circularizing optical element 173 to change the laser beam from an elliptical to a circular profile. Then the beam strikes the half mirror 160 an is reflected toward the disk 130 through the objective lens 145. The data circuits 175 are prepared for recording by the microprocessor 140 supplying suitable control signals over the line 176 in response to recording commands received from the host processor 137. Once the data circuits 175 are prepared, data is transferred between the host processor 137 and the data circuits 175 through the attaching circuits 138 and the control unit 11. The data circuits 175 also include ancillary circuits (not shown) relating to format signals, error detection and correction and the like. The data circuits 175, during a read or recovery action, strip the ancillary signals from the readback signals before supplying corrected data signals over the bus 177 to the host processor 137.

Reading or recovering data from the disk 130 for transmission to the host processor 137 requires optical and electrical processing of the laser light beam from the disk 130. That portion of the reflected light (which has its linear polarization from the polarizer 170 rotated by the disk 130 recording using the Kerr effect) travels along the two-way light path 147, through the lens 145 and half-mirrors 160 and 161 to the data detection portion 179 of the headarm 133 optics. Optical element 173 is a polarization dependent element which processes the polarization state of the reflected beam. When the reflected beam has no Kerr rotation, the optical element 173 balances the beam intensity equally between two orthogonal polarization states. The reflected beam then travels into the polarizing beam splitter 180 which divides the beam into two beams which have the relative intensities of the two orthogonal polarization states coming in. Lenses 181 and 183 respectively focus the two beams onto the two photodetectors 182 and 184. A differential amplifier 185 senses the difference between the two photodetector supplied signals. When the remanent magnetization on the disk 130 spot being accessed has a "north" or binary one indication, the polarization of the reflected beam is rotated. This "north" rotated reflected beam is then processed by the optical element 137. The rotation of the incoming beam results in the intensity of the beam in the first polarization state being increased and the intensity of the beam in the second polarization state being decreased. The intensity of the light falling on the photo-detector 182 is increased; the intensity of the light falling on the other photo-detector 184 is decreased. A "south" rotated reflected beam gives the opposite effect—the intensity in the first polarization state and onto the photo-detector 182 is decreased and the intensity in the second polarization state and onto the photo-detector 184 is increased. The amplifier 185 creates a signal representing the polarization rotation of the reflected beam by amplifying the difference between the intensity of the light falling on the photo-detectors 182 and 184. The amplifier 185 supplies the resulting difference or data representing signal to the data circuits 175 for detection. The detected signals include not only data that is recorded but also all of the so-called ancillary signals as well. The term "data" as used herein is intended to include any and all information-bearing signals, preferably of the digital or discrete value type.

The rotational position and rotational speed of the spindle 131 is sensed by a suitable tachometer or emitter sensor 190. The sensor 190 can be on any sensing system such as a head effect system or optical-sensing type that senses dark and light spots on a tachometer wheel (not shown) of spindle 131, etc. The sensor 190 supplies the digital "tach" signals to the RPS circuit 191 which detects the rotational position of the spindle 131 and supplies rotational information-bearing signals to the microprocessor 140. The microprocessor 140 employs such rotational signals for controlling access to data storing segments on the disk 130 as is widely practiced in the magnetic data storing disks. Additionally, the sensor 190 signals are also transmitted to spindle speed control circuits 193 for controlling the motor 132 to rotate the spindle 131 at a constant rotational speed. The control circuits 193 may include a crystal-controlled oscillator for controlling the motor 132 speed, as is well known. The microprocessor 140 supplies control signals over the line 194 to the control circuits 193 in the usual manner.

A line 204 is used to better control load and unload operations by interfacing directly with the controller 11 rather than using the attaching circuits 138.

Dust, lint, smoke particles and other common airborne pollutants can infiltrate the recorder 12 and light on exposed surfaces of the optical elements. The objective lens 145 is particularly vulnerable to such contamination. As contaminants build up on the optical elements, the intensity of light reaching the disk 12 and reaching the detectors 162 and 184 is reduced, thereby reducing readback signal levels, adversely affecting read, write, seek and tracking performance and leading to premature failure of the drive.

Figure 3:
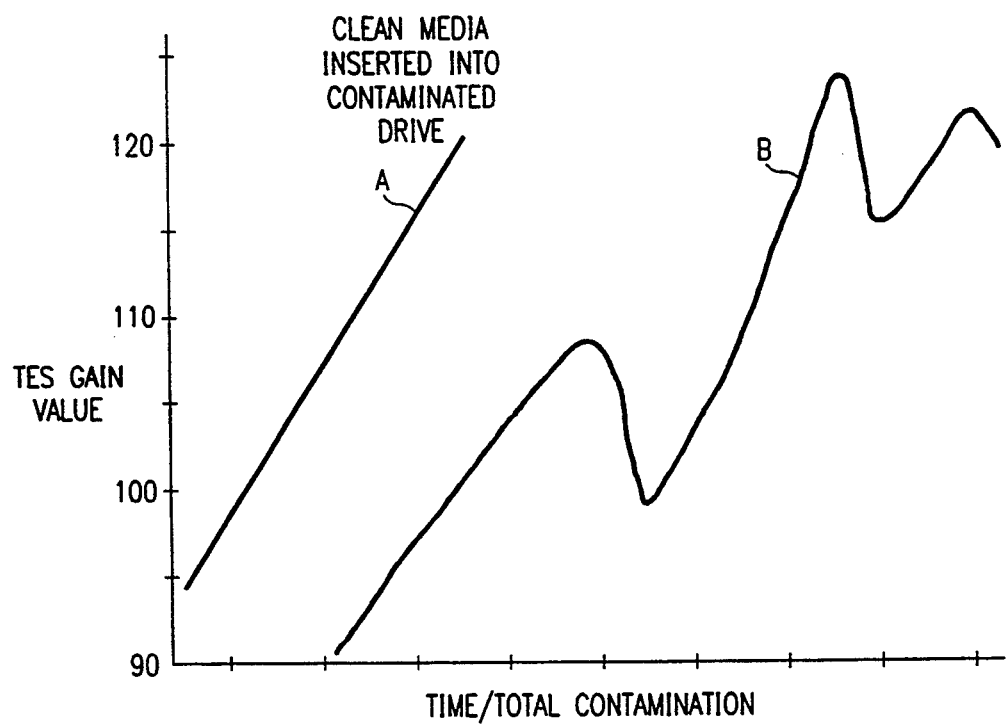
FIG. 3, curves 'A' and 'B' are graphical plots of contamination level within an optical disk recorder versus TES gain, without and with drive cleaning, respectively.

Moreover, as illustrated by the curve labelled 'A' in FIG. 3, as contamination accumulates in the drive over time (indicated by the horizontal axis in arbitrary units), the TES gain (indicated by the vertical axis in arbitrary units relative to a base level of 100) is increased to maintain the peak-to-peak value of the TES at a constant level. However, if the TES gain increases by more than about twenty or twentyfive percent above the base level, excessive drive contamination is indicated and drive failure is likely to occur.

Although other signals, such as the laser power current, the relative position error offset value, the laser write power, the focus error signal offset and the tracking error signal offset, have also been tested as means for monitoring contamination levels. Such other signals can be sensitive to changes in disk reflectivity, as may be caused by normal aging. By contrast, it has been found that the TES gain increases greatly and substantially linearly as the level of contamination increases. Moreover, the TES gain is affected by the contrast of the diffracted orders on elements of the detector 162, but not by the overall amount of light falling on the detector 162. The TES gain is, therefore, relatively insensitive to variations in the reflectivity of the media surface (such as can occur due to aging). Finally, the TES gain is already available on one of the lines between the drive 12 and the host 137. Consequently, the TES gain can be used easily and reliably as an indicator of contamination level within the drive, without additional sensors or circuits.

The present invention monitors the TES gain and compares it with the base value. As illustrated by the curve labelled 'B' in FIG. 3, when the TES gain reaches a predetermined amount relative to the base level, a procedure is initiated to clean optical elements in the drive (indicated by the three peaks in curve 'B' followed by TES gain reductions). Because not all of the optical surfaces in the drive are accessible for cleaning, the TES gain does not decrease back to the base level. Therefore, contamination on the inaccessible surfaces can eventually build up to the point of causing drive failure. However, the life of the drive will have been substantially extended due to the gain-triggered cleanings.

Figure 4:
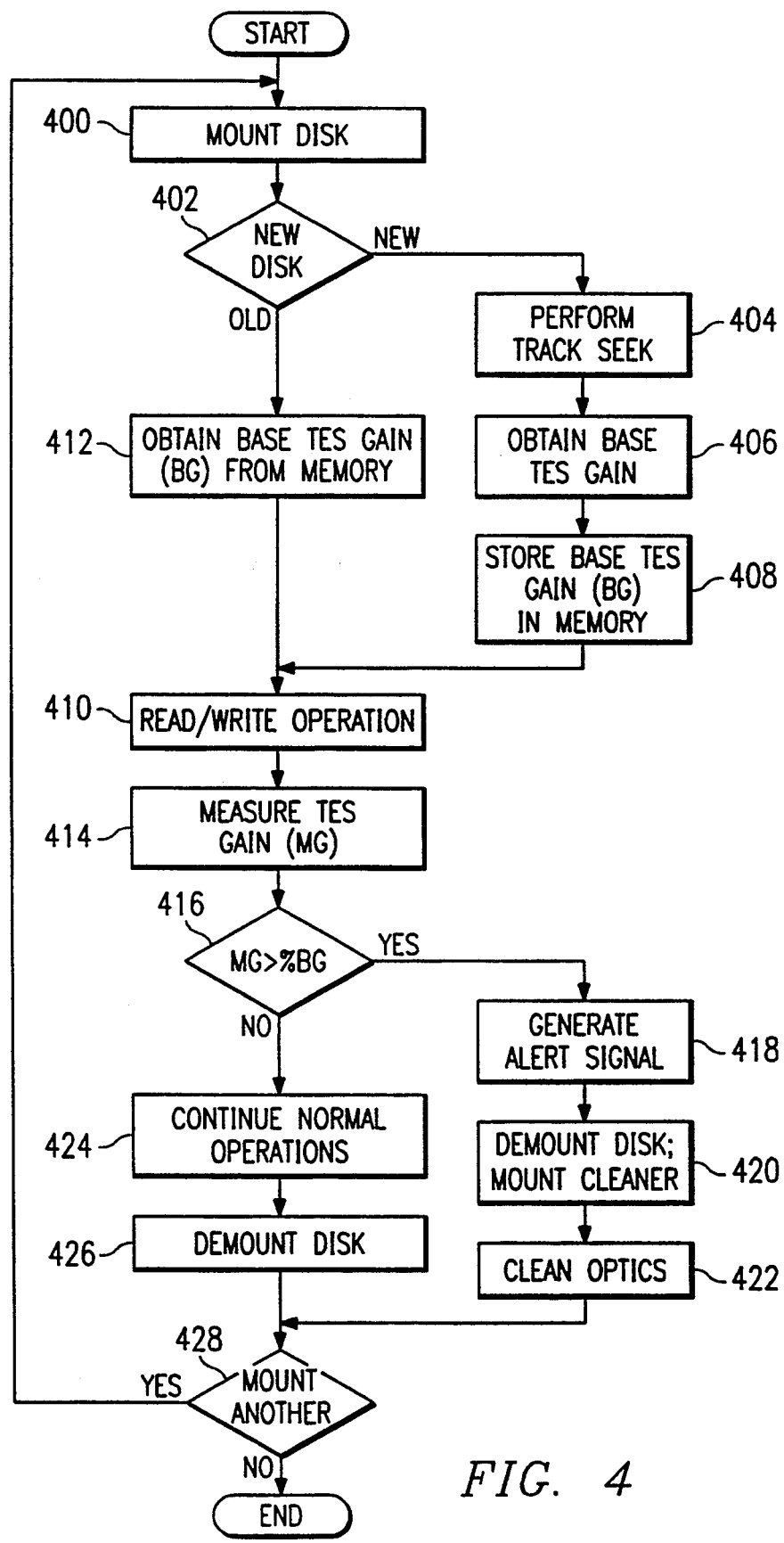
FIG. 4 is a flow chart of a procedure of the present invention.

Referring now to the a flow chart of FIG. 4, a procedure of the present invention will now be described which is adaptable to a library environment as well as to an individual (stand alone) optical drive. An optical disk is mounted in the drive (Step 400) and a determination made (Step 402) whether the disk is a new disk with no user data recorded on it or an old disk with previously recorded user data. If a new disk, a track seek operation is performed (Step 404) to obtain a base value of the TES gain (Step 406). The base TES gain is then stored in a memory unit (Step 408). The memory unit is preferably the optical disk itself but can instead be any other non-volatile memory, including non-volatile RAM, a dedicated optical disk (in a library environment) or a magnetic disk. Once the base TES gain is stored, the drive performs a requested read or write operation (Step 410).

If the disk is an old disk (Step 402), the previously stored base TES gain is obtained from the memory unit (Step 412) and the read or write operation performed (Step 410).

During the read or write operation (Step 410), the TES gain is measured (Step 414) and transmitted by the drive microprocessor 140 (FIG. 1) through the attaching circuits 138 to the host processor 137. A comparison is then made (Step 416) to determine whether the measured TES gain has increased by more than a particular amount relative to the base gain. For example, it has been found that, if drive failure tends to occur when the measured TES gain exceeds about 125% of the base gain, a trigger level of about 110% provides a satisfactory balance between the inconvenience and time requirements of too frequent cleanings (if the trigger level was set too close to the base level) and the reduced drive life which could occur from too infrequent cleanings (if the trigger level was set too close to the failure level ).

If the measured TES gain exceeds the trigger level, an alert signal is generated (Step 418) and a request made to clean the drive. The currently mounted disk is demounted and a cleaning cartridge mounted in its place (Step 420). Those optical surfaces which are accessible to the cleaning cartridge are then cleaned (Step 422). If the measured TES gain is still less than the trigger level, normal read and write operations continue (Step 424) until the disk is demounted (Step 426).

After demounting either the cleaning cartridge or the optical disk (Step 428), another disk can be mounted in, which case the routine returns to the beginning (Step 400), or the routine can end.

While the invention has been particularly shown and described with reference to preferred embodiments thereof, it will be understood by those skilled in the art that various changes in form and details may be made therein without departing from the spirit and scope of the invention.

What is claimed is:

1. An optical disk drive, comprising:
   a drive motor for rotating an optical disk mounted thereto, the disk having a plurality of tracks;
   a light source for projecting a light beam;
   an optical head having optical elements for focusing the light beam on a surface of the disk;
   an actuator for transporting said optical head in a radial direction across the surface of the disk;
   first processing means for receiving a first portion of the light beam reflected off of the surface of the disk and for generating a first signal representative of information recorded on the disk;
   second processing means for receiving a second portion of the light beam reflected off of the surface of the disk and for generating a second signal representative of track crossings;
   means for determining a gain value of the second signal;
   means for establishing and storing a base gain value of the second signal;
   means for comparing the determined gain value of the second signal with the stored base gain value;
   means for generating an alert signal if the determined gain value exceeds a predetermined percentage of the base gain value, the alert signal indicative of an excessive buildup of contamination on optical elements in the optical recording device; and
   means for cleaning at least a portion of said optical head in response to the alert signal.

2. The optical disk drive of claim 1, wherein said second signal is a tracking error signal.

3. The optical disk drive of claim 2, wherein said second processing means comprises a quad-detector optically coupled to receive the second portion of the reflected light.

4. The optical disk drive of claim 1, further comprising a Small Computer Systems Interface (SCSI) interconnecting said optical disk drive with a host device for the exchange of signals therebetween;
   said means for generating an alert signal comprising means for transmitting the second signal gain to the host device through the Small Computer Systems Interface, whereby the host device activates said means for cleaning.

5. An apparatus for monitoring a buildup of contamination on optical elements in an optical recording device, comprising:
   means for generating a tracking error signal indicative of track crossings on an optical disk;
   means for determining a gain value of the tracking error signal;
   means for comparing the gain value of the tracking error signal with a predetermined value;
   means for generating an alert signal if the gain value exceeds the predetermined value, the alert signal indicative of an excessive buildup of contamination on optical elements in the optical recording device; and
   means for cleaning at least a portion of said optical elements in response to the alert signal.

6. The apparatus of claim 5, wherein said means for generating a tracking error signal comprises a quad-detector optically coupled to receive light from a light source and reflected off of a surface of the optical disk.

7. The apparatus of claim 5, further comprising:
   a plurality of addressable storage cells for holding a plurality of optical disks;
   an accessor for transporting a selected one of the plurality of optical disks between a storage cell and said optical recording device; and
   a controller interconnected with said optical recording device and including means for determining and storing a predetermined value of the tracking error signal gain for each of the optical disks.

8. The apparatus of claim 5, further comprising an interface for interconnecting the optical recording device with a host device, said means for generating an alert signal including means for transmitting the tracking error signal gain to the host device through said interface for enabling the host device to activate said means for cleaning.

9. The apparatus of claim 8, wherein said interface comprises a Small Computer Systems Interface (SCSI) device.

10. The apparatus of claim 5, wherein:
    said means for determining comprises means for measuring an initial gain value of the tracking error signal of the optical disk when the optical disk is mounted in the optical recording device for the first time; and
    said apparatus further comprises memory means for storing the initial gain value as the predetermined value and means for writing the initial gain value to said memory means.

11. The apparatus of claim 10, wherein said memory means comprises the optical disk.

12. The apparatus of claim 10, wherein said memory means comprises a non-volatile memory device.

13. The apparatus of claim 10, wherein said memory means comprises a magnetic disk.

14. A method for monitoring a buildup of contamination on optical elements in an optical recording device, comprising the steps:
    mounting an unrecorded optical disk in an optical recording device;

measuring an initial gain of the tracking error signal;
storing the initial gain of the tracking error signal in a memory device as a base gain value;
initiating a seek operation on the optical disk mounted in the optical recording device;
generating a tracking error signal indicative of track crossings;
determining a gain value of the tracking error signal;
comparing the determined gain value with the stored base gain value;
generating an alert signal if the determined gain value exceeds a predetermined value relative to the base gain value, the alert signal indicative of an excessive buildup of contamination on optical elements in the optical recording device; and
cleaning optical elements in the optical recording device in response to the alert signal.

15. The method of claim 14, wherein said cleaning step comprises the step of cleaning optical elements in the optical recording device by a cleaning device mounted therein in response to the alert signal.

16. The method of claim 14, wherein said step of generating an alert signal comprises the step of generating the alert signal if the determined gain value exceeds approximately 110% of the base gain value.

17. The method of claim 14, further comprising the step of transmitting the tracking error signal gain to a host device through a Small Computer Systems Computer (SCSI) device to notify the host device of excessive contamination on the optical elements.

18. An automated optical storage and retrieval system, comprising:
an optical disk drive;
a plurality of addressable storage cells for holding a plurality of optical recording disks;
an accessor for transporting a selected one of the plurality of optical recording disks between a respective storage cell and said drive; and
a library controller interconnected with a host device, said drive and said accessor;
said drive having:
a drive motor for rotating an optical disk mounted thereto, the disk having a plurality of tracks;
an optical system having a light source for projecting a light beam, an optical head having optical elements for focusing the light beam on a surface of the disk and a sensor for detecting light reflected from the surface;
an actuator for transporting said optical head in a radial direction across the surface of the disk; and
a tracking error signal generator responsive to said sensor for generating a tracking error signal; and
said library controller having:
means for measuring a gain value of the tracking error signal;
means for comparing a measured gain value of the tracking error signal with a predetermined base gain value;
means for generating an alert signal if the gain value of the tracking error signal exceeds a predetermined relative amount of the base gain value, the alert signal indicative of an excessive buildup of contamination on the optical elements in the optical disk drive; and
means for cleaning at least a portion of the optical elements in response to the alert signal.

19. The system of claim 18, further comprising:
means for measuring a base gain value of the tracking error signal of the selected optical recording disk when the disk is unrecorded; and
means for storing the base gain value.

20. The system of claim 19, wherein said means for storing comprises the selected optical recording disk.

21. The system of claim 18, further comprising a Small Computer Systems Interface (SCSI) device interconnecting said library controller with said optical disk drive for the transmission of signals from the optical disk drive to the library controller.

22. The system of claim 18, further comprising a cleaning cartridge held in one of said storage cells.

* * * * *